United States Patent [19]

Kastl et al.

[11] Patent Number: 4,741,938
[45] Date of Patent: May 3, 1988

[54] WEB-SHAPED OR TUBULAR PACKAGING FILM, IN PARTICULAR A SAUSAGE CASING, WITH A BARRIER LAYER

[75] Inventors: Erna Kastl, Niedernhausen; Ludwig Klenk, Oestrich-Winkel III; Karl Stenger, Ruedesheim; Horst Faust, Wiesbaden, all of Fed. Rep. of Germany

[73] Assignee: Hoechst Aktiengesellschaft, Frankfurt am Main, Fed. Rep. of Germany

[21] Appl. No.: 924,416

[22] Filed: Oct. 29, 1986

[30] Foreign Application Priority Data

Oct. 31, 1985 [DE] Fed. Rep. of Germany ....... 3538702

[51] Int. Cl.$^4$ .................. F16L 11/00; B05D 3/02; A22C 13/00
[52] U.S. Cl. ..................................... 428/36; 428/510; 138/118.1; 426/105; 426/140; 427/394; 427/412.2
[58] Field of Search ............... 428/36, 510; 138/118.1, 138/145, 156; 426/105, 135, 140, 412; 427/394, 412.2

[56] References Cited

U.S. PATENT DOCUMENTS

| | | | |
|---|---|---|---|
| 2,819,488 | 1/1958 | Gimbel | 17/42 |
| 2,961,323 | 11/1960 | Underwood et al. | 138/118.1 |
| 3,594,857 | 7/1971 | Michl | 17/42 |
| 3,619,854 | 11/1971 | Ilgen et al. | 17/42 |
| 3,766,603 | 10/1973 | Urbutis et al. | 17/42 |
| 3,988,804 | 11/1976 | Regner et al. | 17/45 |
| 4,116,162 | 9/1978 | Dinter et al. | 118/104 |
| 4,192,904 | 3/1980 | Gerigk et al. | 428/36 |
| 4,233,341 | 11/1980 | Hammer et al. | 427/230 |
| 4,283,426 | 8/1981 | Schenk et al. | 138/118.1 |
| 4,396,039 | 8/1983 | Klenk et al. | 138/118.1 |
| 4,401,135 | 8/1983 | Andrae et al. | 138/118.1 |
| 4,401,136 | 8/1983 | Porrmann et al. | 138/118.1 |
| 4,478,670 | 10/1984 | Heyse et al. | 156/380.1 |
| 4,562,101 | 12/1985 | Andrae et al. | 428/36 |

FOREIGN PATENT DOCUMENTS 0149071 7/1985 European Pat. Off. .
1347697 11/1963 France .

*Primary Examiner*—John E. Kittle
*Assistant Examiner*—James J. Seidleck
*Attorney, Agent, or Firm*—Schwartz, Jeffery, Schwaab, Mack, Blumenthal & Evans

[57] ABSTRACT

A web-shaped or tubular packaging film for use in food packaging applications, particularly as a sausage casing, is comprised of a carrier layer based on fiber-reinforced celulose and a closed thermoplastic, sealable resin coating based on copolymers containing vinylidene chloride (VDC) units. To improve the kink resistance, this resin coating is built up from at least two superposed layers, the first resin coating layer adjacent to the carrier layer being composed of a VDC copolymer forming flexible films and the outer, second resin coating layer being composed of a VDC copolymer forming rigid films. The web-shaped film is suitable for the production of tubular packaging casings, in particular sausage casings, with a longitudinal seam.

19 Claims, No Drawings ated also shirred, the barrier
WEB-SHAPED OR TUBULAR PACKAGING FILM, IN PARTICULAR A SAUSAGE CASING, WITH A BARRIER LAYER

BACKGROUND OF THE INVENTION

The invention relates to a web-shaped or tubular packaging film, in particular a sausage casing, comprising a carrier layer of fiber-reinforced cellulose, and a resin coating of at least two layers of vinylidene chloride copolymers, and to a process for the production thereof.

A tubular casing, in particular a sausage casing, which is produced from a film web, has been disclosed by European Patent Application No. 0,054,162. For this purpose, the film web is formed to give a tube and the two edge regions, brought into proximity of each other, are joined by means of a film strip, the film strip being sealed against the gas-impermeable sealable surface layer of the film web. Owing to its oxygen-, water- and water vapor-impermeable layer, this tubular casing is suitable, for example, as a sausage casing for cooked and scalded sausages.

By contrast, the film of fiber-reinforced cellulose according to European Patent Application No. 0,149,071 shows, in addition to a closed barrier layer, also a thermoplastic synthetic resin layer with linear interruptions on the other surface. This known film can also be used for the poduction of tubes with a sealed seam.

These sausage casings with a barrier layer can be shirred by conventional processes. For this purpose, relatively long lengths of tubing are conveyed in the direction of the longitudinal axes and shirred in the inflated state against a counter-force. The length of the shirred casing, which is also called a stick, is usually no more than 1 to 3% of the original tubing length. In use, sausage emulsion is continuously injected by means of sausage-filling machines into the stick, which is closed at one end, the tubes being unshirred again.

It has been known for a long time that barrier layers on the surface of cellulose tubes are susceptible to mechanical stresses and can easily suffer damage. A mechanical stress arises in particular on shirring, above all in the region of the edges of the tube folds, where the tube and also the surface layer are sharply kinked. However, the tube coatng frequently does not break during or immediately after the shirring process, but initially shows satisfactory behavior. It is only on storage of the shirred tube that the coating then tends to break at the most highly stressed points. This causes an uncontrollable and undesired permeability of the coating for water vapor, oxygen and aroma substances, so that the durability and quality of the sausage are impaired. This effect is ascribed to the tendency of polymers containing a high proportion of vinylidene chloride to embrittle after the formation of an initially supple film. This aging process starts when the film is formed and reaches its end point after a few weeks, when the coating has lost it original suppleness and extensibility. To avoid these disadvantages, a quaternary copolymer of vinylidene chloride, acrylonitrile, acrylic acid and methyl acrylate is to be used according to German Pat. No. 2,512,994 as the coating material for shirred tubular casings. These coatings produce permanently flexible coatings on the inside of cellulose tubes.

As has now been found, these polyvinylidene chloride copolymers, which form relatively flexible coatings, are rather less suitable for the production of shirred tubular casings with an external barrier layer. The coating tends to break at the kink points, the cause of this not being immediately obvious. The risk of the coating breaking at the kink points also exists when tubes with an outer barrier layer are stored, being wound up in the flattened state.

SUMMARY OF THE INVENTION

It is therefore an object of the invention to provide a web-shaped or tubular packaging film of fiber-reinforced regenerated cellulose for use as a sausage casing with a preferably external barrier layer for oxygen, water and water vapor, which can be satisfactorily wound up and in particular also shirred, the barrier layer not being damaged by the high kink stress thereby arising, and remaining impermeable at the kink points even on prolonged storage under tropical conditions. It is a further object of the invention to provide a process for the production of this web-shaped or tubular film, which can be carried out with small technical expense. Moreover, the coating must withstand the stresses during processing and storage of the sausage casing.

When starting from a sausage casing with a carrier layer of fiber-reinforced cellulose and a closed, gas-impermeable resin layer on one of its surfaces, and searching for a solution to this problem, the difficulty is encountered that, when modifications are made to the coating, its existing advantageous properties may be adversely affected. If the sausage casing is shirred, the coating improved with respect to the kink resistance must also not only have a sufficient mechanical strength, but additionally be flexible, extensible and shrinkable. Moreover, the virtually complete impermeability of the known barrier layers to gases, in particular water and atmospheric oxgen, must not be allowed to deteriorate.

In accomplishing the foregoing objects, there has been provided in accordance with one aspect of the present invention a web-shaped or tubular film for use in food packaging applications, particularly as a sausage casing, comprising a carrier layer comprised of fiber-reinforced cellulose, and on one surface of the carrier layer a resin coating comprised of at least first and second layers comprised of vinylidene chloride copolymers, wherein the first layer of said resin coating is adjacent to the carrier layer and comprises a vinylidene chloride copolymer which forms a flexible film, and the second layer of said resin coating comprises a vinylidene chloride copolymer which forms a rigid film. Preferably, the vinylidene chloride copolymer of the first layer is comprised of about 80 to 88% by weight vinylidene chloride units with the balance comprising other film-forming comonomer units, preferably selected from the group consisting of alkyl acrylates and alkyl methacrylates with alkyl groups in the range from about $C_3$ to $C_8$; vinyl esters of fatty acids of from about $C_3$ to $C_{12}$; hydroxyethylacrylate; hydroxyethylmethacrylate; ethoxyethylacrylate; acrylamide; acrylonitrile; methacrylonitrile; and alkyl- and di-alkyl-acrylamide with alkyl groups being $C_1$ to $C_3$. Preferably, the vinylidene chloride copolymer of said second layer is comprised of about 85 to 95% by weight vinylidene chloride units with the balance comprising other film-forming comonomer units, preferably selected from the group consisting of alkyl acrylates and alkyl methacrylates with alkyl groups being either methyl or ethyl.

In accordance with another aspect of the invention, there has been provided a process for producing a web-shaped or tubular film for use in food packaging applications, particularly as a sausage casing, comprising the following steps: (a) coating a fiber web or tube with viscose; (b) coagulating the viscose; (c) regenerating the coagulated viscose to form cellulose hydrate gel; (d) washing the web or tube of cellulose hydrate gel; (d) pre-drying the web or tube of cellulose hydrate gel to a water content of about 130 to 225% by weight, relative to the total weight of the cellulose hydrate gel, to form a cellulose hydrate gel film; (f) applying a first layer of a first aqueous vinylidene chloride copolymer dispersion to one side of the film; (g) applying a second layer of a second different vinylidene chloride copolymer dispersion onto the first layer; and (h) drying the web or tube of cellulose hydrate gel to form a web-shaped or tubular packaging film of fiber-reinforced regenerated cellulose with a water content of less than about 15% by weight, relative to the total weight of said film, with the drying being carried out by heating sufficient to form an impermeable polymer coating of the vinylidene chloride copolymers.

Further objects, features and advantages of the present invention will become apparent from the detailed description of preferred embodiments which follows.

DETAILED DESCRIPTION OF THE PREFERRED EMBODIMENTS

A substantially gas-impermeable resin coating is to be taken as a coating which has a water vapor permeability of less than 10 g/m$^2$ ×d, and in particular, less than 2 g/m$^2$×d (DI 53 122). The coating layer is completely free of interruptions and is therefore also called a "blocking layer" or "barrier layer".

Web-shaped or tubular films based on fiber-reinforced cellulose, having a gas-impermeable surface layer composed of a resin based on a copolymer containing vinylidene groups, which, if appropriate, is anchored to the film surface by means of an adhesion-promoting resin layer, and tubular casings produced from these film webs and having a longitudinal seam, and their production are known. The actual carrier layer of the film is composed of fiber-reinforced cellulose (transparent cellulose film, regenerated cellulose, cellulose hydrate) and is produced by the viscose process. It has a thickness, usual for sausage casings, of 50 to 200 μm, corresponding to a weight per unit area of 50 to 250 g/m$^2$, and normally a moisture content of less than 15% by weight, relative to the total weight. A higher moisture content is necessary only for shirring the tubular casing. In addition, the packaging film has a usual plasticizer content (glycerol) of approximately 20 to 40% by weight. The total thickness of the resin coating is in the region of 5 to 25 μm, and in particular, 8 to 15 μm.

Adhesion promoters in respect of surface layers are to be understood, as is known, as substances or subtance mixtures which are applied to the surface of the carrier layer before the application of the other layers, in order to improve the adhesion between the carrier layer and the coating. If necessary, these are intended in the present case to provide anchoring with wet strength for the first surface layer on the surface of the carrier layer, and they are located between the first surface layer and the carrier layer. Preferably, this is a water-insoluble, cured, cationic resin. Polyurethane resins, nitrocellulose and other compounds known as water-insoluble anchoring agents can also be employed. The dispersion containing the adhesion promoter is applied already during the production of the fiber-reinforced carrier layer of cellulose hydrate to the web-shaped or tubular cellulose hydrate gel which has already been regenerated but not yet dried. This application can be carried out before, simultaneously with, or after the treatment of the cellulose hydrate gel with a plasticizer such as, for example, a polyol. The fiber-reinforced carrier layer of regenerated, but not yet dried cellulose, that is to say of cellulose hydrate gel, is covered, before coating with the dispersion forming the first surface layer, with an aqueous solution which contains up to 25% by weight of a dispersible adhesion promoter, in particular a thermosetting cationic resin.

The thermosetting cationic resin is cured by the subsequent drying stages to give its water-insoluble form, a permanet bond to the surface of the carrier layer being produced. The adhesion-promoting resin layer has a weight per unit area of about 30 to 300 mg/m$^2$, preferably 40 to 75 mg/m$^2$. Particularly preferred cationic thermosetting resins are condensation products of a polyamide-polyamine or aliphatic polyamines or of polyamides with bifunctional halohydrins or derivatives thereof, in particular epichlorohydrin.

After the dispersion of the adhesion promoter has been applied, the reduction of the water content, designated as partial dehydration or pre-drying, of the carrier layer of cellulose hydrate gel to a water content of 130 to 200% by weight, relative to the cellulose, is carried out. During this partial dehydration, the cationic resin is partially pre-cured under the action of heat.

The essential point for solving the problem described at the outset is the successive application of at least two surface layers, which together form the gas-impermeable resin coating, to one surface of the carrier layer. The terms "first" and "second" surface layer are intended to indicate the order in which these are applied, successively in time, to one surface of the carrier layer.

The synthetic resin of the first surface layer is a vinylidene chloride (VDC) copolymer which forms relatively soft, flexible layers which, even during a prolonged storage period, do not crystallize but remain substantially in the amorphous state. Such VDC copolymers contain, as is known, a relatively low proportion of vinylidene chloride (VDC), which is usually below 88% by weight, and, as further comonomer units, which form film-forming polymers, preferably alkyl acrylate or alkyl methacrylate with long-chain alkyl radicals in the ester group or vinly esters of fatty acids ($C_3$—$C_{12}$), the length of the C-H group representing a steric hindrance to crystallization of the polymer chains. Advantageously, the alkly groups in the acrylates/methacrylates are in the range from $C_3$ to $C_8$, such as, for example, butyl acrylate or 2-ethylhexyl acrylate. Comonomers with strongly polar groups, such as, for example, hydroxyethyl methacrylate or acrylate, ethoxyethyl acrylate, acrylamide and alkyl- and dialkyl-acrylamide (alkyl $C_1$-$C_3$), but in particular acrylonitrile or methacrylonitrile, also give relatively soft, flexible layers. In addition to these comonomer units mainly present, minor quantities of further ethylenically unsaturated compounds can also be copolymerized with the said monomers to give the VDC copolymers. These include, for example, unsaturated acids and derivatives thereof, in particular acrylic acid and methacrylic acid, by means of which, for example, the adhesion, the flow and wetting of the polymer can be influenced. A proportion of up to 2% by weight in the copolymer of these comonomers is usually sufficient. Up to three further comonomer units in addition to the VDC units can be present in the VDC copolymer.

By contrast, the raw material for the second surface layer of the film is a VDC copolymer which usually has a higher VDC content and, if only for this reason, forms a surface layer which, after it has been produced, tends to crystallize extensively and therefore becomes substantially more rigid than layers which are formed by the VDC copolymer of the first surface layer. The rigidity of the second surface layer also results from the alkyl acrylate or alkyl methacrylate units (alkyl=methyl or ethyl) preferably present as a further comonomer in the VDC copolymer. In addition to these comonomer units mainly present, minor quantities of further ethylenically unsaturated compounds can also be copolymerized with the VDC and the acrylates/methacrylates. In this case, these comonomers also include, above all, unsaturated acids and derivatives thereof, and in particular acrylic acid and methacrylic acid, with a proportion of up to 2% by weight in the copolymer usually being sufficient. Up to three further comonomer units in addition to the VDC units, which usually make up 85 to 95% by weight of the copolymer, can be present in the VDC copolymer.

Suitable VDC copolymers are obtained, for example, by addition polymerization of the monomers in aqueous dispersion. These aqueous dispersions are commercially available. The dispersions used for the first surface layer are defined in the technical data sheets of the manufacturing firms by the fact that they form particularly soft, flexible, supple, amorphous films, whereas the commercially available dispersions for the formation of the second surface layer form, according to the technical data sheets of the manufacturing firms, crystallizing films and coatings which exhibit a rigid, non-blocking surface, which seal particularly against water vapor, gases and aroma substances, and which are particularly resistant to water, oils, fats and many chemicals.

A process for the production of the film comprises the steps of:

(1) coating a fiber web or tube with viscose;
(2) coagulating the viscose;
(3) regenerating the coagulated viscose to form cellulose hydrate gel;
(4) washing the cellulose hydrate gel;
(5) pre-drying the cellulose hydrate gel to a water content of about 130 to 225% by weight to form a film;
(6) applying a first layer of an aqueous polyvinylidene chloride dispersion to one side of the film;
(7) applying a second layer of an aqueous polyvinylidene chloride dispersion onto the first layer; and
(8) drying the film to a water content of less than about 15% by weight.

The fiber web, which may have been bent to form a tube, is treated, preferably on both sides, with a viscose solution, and in particular is immersed into a viscose solution or coated with a viscose solution, for example by means of slot dies, rollers or spray devices, is then coagulated with precipitation fluid and converted into regenerated cellulose. It is also possible to incorporate reinforcing fibers in the viscose. The fiber-containing viscose is then forced out through a nozzle into the coagulation bath, a gel web being formed. The viscose solution is an alkaline solution of sodium cellulose-xanthate. The spinning bath for coagulation of the viscose usually contains sulfuric acid, sodium sulfate and/or ammonium sulfate. In further stages, the web-shaped or tubular product consisting of coagulated viscose is then regenerated in an acid medium to give cellulose hydrate gel, washed with water to remove acid and salts, desulfurized and, if appropriate, passed through a bleaching bath and finally through a plasticizer bath.

Before the fiber-reinforced web or the fiber-reinforced tube of cellulose hydrate gel is finally converted into regenerated cellulose by intensive drying at 90° to 160° C. and, if appropriate, adjusted by conditioning to a water content of up to 15% by weight, relative to the total weight, the web or tube of cellulose hydrate gel—after it has been treated, if appropriate, with a liquid containing an adhesion promoter—is partially dehydrated and then coated successively on one of its surfaces, in the case of the tube preferably on the outer surface, with the aqueous VDC dispersions which form the first and second surface layers. It is necessary to adhere to the order of the coatings which follow the partial dehydrations.

A web-shaped film with particularly advantageous mechanical properties is obtained when, as described in European Patent Application No. 0,054,162, the fiber web is firmly held by its edges, so that shrinkage of the web is prevented, in particular during the coagulation of the viscose and during the final drying process but, if appropriate, also during the coating with viscose, during regeneration, during coating with the adhesion promoter and/or during coating with the VDC dispersions.

It is essential for the application of the VDC dispersion that, immediately before the fiber-reinforced film of cellulose hydrate gel is coated with the VDC dispersion forming the first surface layer, the water content of this film which is relatively high, as is known, and usually amounts to 240 to 300% by weight, relative to the cellulose, is reduced to values of 130 to 225% by weight, and in particular to 160 to 200% by weight. During this intermediate stage, designated as a partial dehydration, shrinkage of the film transversely to the machine direction is allowed, either by not holding the edges of the web-shaped film during this predrying, or by inflating the tubular film with, for example, only a slight pressure of supporting air. The heat required for this partial dehydration is supplied to the film by known means as for example by hot air or radiant heaters. It is important that the partially dehydrated, heated film retains its elevated temperature up to the time of the subsequent coating with the first VDC dispersion. During the application of this dispersion, the temperature of the partially dehydrated film must be higher than the minimum temperature for the formation of a film from the first VDC dispersion (minimum temperature for film formation).

A further essential feature of the process is that, for applying the agent forming the first surface layer to the partially dehydrated fiber-reinforced film of cellulose hydrate gel, a highly concentrated aqueous dispersion is used, the solids content of which is at least 45% by weight, preferably 45 to 65 and especially 50 to 60% by weight, and, for applying the agent forming the second surface layer, an aqueous dispersion of low concentration, i.e., 10 to 45% by weight, is used, as is usual in the production of gas-tight surface layers of VDC copolymers. It is particularly advantageous when, in these coating steps, the quantity of water absorbed by the partially dehydrated film of cellulose hydrate gel from the first highly concentrated dispersion is less than the quantity of water removed from the film in the preceding partial dehydration. The quantity of water to be absorbed by the film is adjusted by appropriate setting of the solids content of the dispersions and/or their time of action on the film.

A further essential feature of the process is that the second PVDC dispersion is applied to the film within a short interval without intermediate drying of the PVDC dispersion applied first. Advantageously, this interval is about 0.5 to 5 seconds, and in particular 1 to 3 seconds.

A further essential process step is that the cellulose hydrate gel web or tube, is additionally stretched during the final drying in the transverse direction by about 1 to 15%, and in particular 3 to 12%, relative to the original width of the fiber web or the original circumference if a fiber tube is used, whereby the slight shrinkage which has optionally occurred during the partial dehydration is at least compensated in the transverse direction. Immediately before this stretching during the final drying process and thus after coating with the VDC dispersion forming the second surface layer, a further pre-drying is carried out, if appropriate, wherein the major quantity of water is removed, until the film of cellulose hydrate gel has a water content of about 80 to 150% by weight.

The film formation from the aqueous VDC dispersion takes place on drying, in a manner known per se. By means of a heat shock, for example with infrared radiation, the dispersion is initially fixed on the surface of the cellulose carrier. However, the set temperature range must not lead to vigorous evaporation of the water, with formation of bubbles. Drying is then continued at a slowly rising temperature until the major part of the moisture has been removed. During this part of drying, the film surface has a temperature of about 70° to 98° C. which, due to the latent heat on evaporation of the water, is not exceeded even at a higher temperature of the surroundings. Exceeding the evaporation temperature of the water in the film surface should be avoided, since otherwise bubbles and pores (burst bubbles) form in the coating. After the moisture content of the coating has fallen to about 5%, treatment is continued at a higher temperature, the surface of the film reaching 120° to 140° C.

The strength values of the carrier layer in the longitudinal and transverse directions, obtained as a result of the shrinkage-preventing measures and the transverse stretching during the drying process, are essential for producing a tubular casing with a longitudinal seam. The tear strength can reach 30 to 35 N/mm$^2$, and the elongation at break can reach 30 to 50% (measured as indicated in European Patent Application No. 0,054,162).

The two-fold coating of the film with the particular dispersion is carried out, for example, by means of wire bars. However, any other controlled coating device can also be used which is suitable for continuous coating of moving films and which allows only a short contact time (0.1 to 2 seconds) between the stock dispersion and the film. For the two-fold application, it is also possible to use roller application systems or a roller application system in combination with a wire bar. The coating weight of the first surface layer is advantageously 4 to 9 g/m$^2$, and that of the second surface layer is 3 to 6 g/m$^2$.

As has been found, the two dispersions form after drying a closed film which is built up from two surface layers firmly adhering to one another. If one of the two dispersions is colored, the two surface layers of the resin coating can be clearly distinguished in cross-section under a microscope.

The desired firm bonding between the cellulose hydrate carrier layer and the first surface layer is not obtained if the water content of the film of cellulose hydrate gel is reduced during the partial dehydration to a maximum value greater than 200% by weight.

Because of the high kink resistance of this resin coating, the film according to the invention, having the special structure of the barrier layer to its surface, is particularly suitable as a sausage casing for cooked and scalded sausages, particularly if the sausage casings are to be shirred. Boiling sausages are to be understood in particular as types of liver sausage and types of black pudding. Examples of scalded sausages are minced pork sausage, ham sausage, coarse pork sausage, yellow sausage and mortadella. All of these types of sausage require a perfectly dense sausage casing.

The formation of a tubular casing with a seam extending along the longitudinal axis from a web-shaped film by sealing the edge regions of the edge zones, extending along the longitudinal axis, of a film web by means of a film strip is known per se, reference being made again to European Patent Application No. 0,054,162. The sealing material used is the thermoplastic resin coating which becomes tacky on heating. For producing lap seams it is advantageous if the film has a coating of sealable thermoplastic synthetic resin also on the opposite surface. The film can also be used as a sealable film strip, the edge regions of the film forming the tube being brought together until they abut, and the film strip being sealed to both edge regions (FIG. 3 of European Patent Application No. 0,037,543). The film forming the tube must, of course, be sealable with the surface layer facing the film strip. Preferably, this surface layer consists of the sealable resin coating according to the invention, which coating forms the inside or outside of the tube, and the film strip is sealed by its gas-impermeable layer on the inside or outside of the tube to this sealable barrier layer.

If the impermeable resin coating is located on the inside of the tube, the packaging casing shows extensive shrinkage and can readily adapt itself to the material filled in. As a sausage casing, it then lies snugly against the sausage meat and provides the sausage with an attractive appearance. If this shrinkage is undesired, the film is formed to give a tubular casing in such a way that the barrier layer of the film forms the outside of the tubular casing.

The packaging casing according to the invention is shirred by means of, for example, the device known from U.S. Pat. No. 3,988,804.

After storage for one week in a room conditioned to a tropical climate (38° C., 98% relative humidity), the shirred packaging casings show no damage to the coating layer in the region of the shirring folds.

The invention is illustrated in more detail by the examples which follow:

EXAMPLE 1

A web of long-fibered manila paper having a flat width of 235 mm and a weight per unit area of 21 g/m$^2$ is coated on both sides with viscose. For precipitation, i.e., coagulation, and regeneration, regenerating fluid is then applied to the web provided with viscose. The web width is kept constant by means of needle chains engaging on the two web edges, so that the shrinkage, which usually occurs on coagulation and regeneration, is prevented in the transverse direction. The fiber-reinforced film web of cellulose hydrate gel then passes through washing, desulfurizing and plasticizing baths. The last bath, through which the film web of cellulose hydrate gel runs, contains a 1% by weight aqueous solution of an adhesion promoter based on a cationic resin which is a reaction product of adipic acid, diethylenetriamine and epichlorohydrin. The film web is coated with this solution on both sides. After it has left this bath, the film web of cellulose hydrate gel has a width of 210 mm and a water content of 250% by weight.

For the partial dehydration which then follows, the film web is passed over heated rollers at a surface temperature of 70° to 80° C. During this step, the film web shrinks to a width of 208 mm and its water content is reduced to 160% by weight.

After this intermediate stage, the film web, while still at 30°-40° C., is fed to a first coating device, as described in U.S. Pat. No. 4,116,162, for applying the dispersion which forms the first surface layer. The blade used for controlled application is a wire bar having a wire thickness of 100 μm. The applied first layer gives a weight per unit area of about 6 to 8 g/m².

The coating agent used for forming the first surface layer is an aqueous polymer dispersion of a copolymer of predominantly vinylidene chloride units and small proportions of acrylonitrile units and other copolymers; this dispersion has a solids content of 55% (Diofan ® 235 D, from BASF) and is known to form soft films of low tendency to crystallization.

After this first application, the coated film surface is fed within an interval of 2 seconds to a second coating device of the same type. The second coating agent used is an aqueous polymer dispersion of predominantly vinylidene chloride units and small proportions of methyl acrylate and further comonomers; this dispersion has a solids content of 40% by weight (Diofan ® 193 D, from BASF) and is known to form rigid, largely crystalline films. The applied second surface has a weight per unit area of 4 to 6 g/m².

The edges of the film web coated with the copolymer dispersions are gripped by tenter needle chains and passed in a tenter frame through several levels of a drying zone. In the tenter frame inlet, the film is extended in the transverse direction to a width of 218 to 220 mm and then dried, preferably at about 130° C., while it is still held to this width. The residual moisture content of the film is about 7% by weight. The barrier layer has a thickness corresponding to a weight per unit area of about 13 to 14 g/m². It is closed and shows a water vapor permeability of 0.5 to 2.0 g/m²×d (DIN 53 122).

A tube with abutting edges is then formed from the film and sealed by a film strip, as described, for example, in FIGS. 3, 4 or 7 of European Patent Application No. 0,058,240.

The tube is closely shirred by means of the device known from U.S. Pat. No. 3,988,804. The sticks obtained are stored for one week in a room conditioned to a tropical climate (38° C., 98% relative humidity). Stick sections are then unshirred, tied off on one side and treated with 0.5% methylene blue solution. At any fractures of the coating layer, the cellulose carrier layer must be dyed by the dye. After removal of the solution and washing with water, no damage to the coating is detectable.

EXAMPLE 2

The paper web of Example 1 is bent to form a tube and the paper tube obtained is coated on both sides with viscose in the usual manner. The tube then runs through the usual stages for coagulation and regeneration of the cellulose and through washing, desulfurizing and plasticizing baths. The tube is then coated on the outside with the solution of the adhesion promoter according to Example 1.

Analogous to Example 1, the tube is partially dehydrated, then coated in the flattened state from the outside with two different polymer dispersions and finally dried in the inflated state.

After shirring, the cellulose tube is tested as in Example 1 for damage to the barrier layer. No fractures are detectable.

What is claimed is:

1. A web-shaped or tubular film for use in food packaging applications, particularly as a sausage casing, comprising a carrier layer comprised of fiber-reinforced cellulose, and on one surface of the carrier layer a resin coating comprised of at least first and second layers comprised of vinylidene chloride copolymers, said first layer of said resin coating being adjacent to the carrier layer and comprising a predominantly amorphous vinylidene chloride copolymer, and said second layer of said resin coating comprising a predominantly crystalline vinylidene chloride copolymer.

2. A web-shaped or tubular film as claimed in claim 1, further comprising an adhesion-promoting interlayer anchoring said resin coating to said carrier layer.

3. A web-shaped or tubular film as claimed in claim 1, wherein the vinylidene chloride copolymer of said first layer of said resin layer is comprised of about 80 to 88% by weight vinylidene chloride units with the balance comprising other film-forming comonomer units.

4. A web-shaped or tubular film as claimed in claim 3, wherein said film-forming comonomers are selected from the group consisting of alkyl acrylates and alkyl methacrylates with alkyl groups in the range from about $C_3$ to $C_8$; vinyl esters of fatty acids of from about $C_3$ to $C_{12}$; hydroxyethylacrylate; hydroxyethylmethacrylate; ethoxyethylacrylate; acrylamide; acrylonitrile; methacrylonitrile; and alkyl- and dialkylacrylamide with alkyl groups being $C_1$ to $C_3$.

5. A web-shaped or tubular film as claimed in claim 4, wherein said film-forming comonomers are selected from the group consisting of acrylonitrile, methacrylonitrile, and alkyl acrylates or alky methacrylates having $C_4$–$C_8$ alkyl groups.

6. A web-shaped or tubular film as claimed in claim 5, wherein said film-forming comonomers are selected from the group consisting of butylacrylate and 2-ethylhexylacrylate.

7. A web-shaped or tubular film as claimed in claim 4, wherein said film-forming comonomers additionally comprise ethylenically unsaturated comonomer units in the range from about 1 to 3% by weight.

8. A web-shaped or tubular film as claimed in claim 7, wherein said ethylenically unsaturated comonomers are selected from the group consisting of acrylic acid and methacrylic acid.

9. A web-shaped or tubular film as claimed in claim 1, wherein the vinylidene chloride copolymer of said second layer of said resin layer is comprised of about 85 to 95% by weight vinylidene chloride units with the balance comprising other film-forming comonomer units.

10. A web-shaped or tubular film as claimed in claim 9, wherein said film-forming comonomers are selected from the group consisting of alkl acrylates and alkyl methacrylates with alkyl groups being either methyl or ethyl.

11. A web-shaped or tubular film as claimed in claim 10, wherein said film-forming comonomers additionally comprise ethylenically unsaturated comonomer units in the range from about 1 to 3% by weight.

12. A web-shaped or tubular film as claimed in claim 1, wherein said resin coating is located on the outside surface of said carrier layer.

13. A web-shaped or tubular film as claimed in claim 1, wherein said film is bent to form a tube, with the edges of said film, extending along the longitudinal axis of said tube, being mutually joined by a seam.

14. A web-shaped or tubular film as claimed in claim 1, wherein said film comprises a tubular sausage casing which is shirred.

15. A process for producing a web-shaped or tubular film for use in food packaging applications, particularly as a sausage casing, comprising the following steps:
  (a) coating a fiber web or tube with viscose;
  (b) coagulating said viscose;
  (c) regenerating said coagulated viscose to form cellulose hydrate gel;
  (d) washing said web or tube of cellulose hydrate gel;
  (e) pre-drying said web or tube of cellulose hydrate gel to a water content of about 130 to 225% by weight, relative to the total weight of said cellulose hydrate gel, to form a cellulose hydrate gel film;
  (f) applying a first layer of a first aqueous vinylidene chloride copolymer dispersion to one side of said film which forms a predominantly amorphous film on drying;
  (g) applying a second layer of a second different aqueous vinylidene chloride copolymer dispersion onto said first layer which forms a predominantly crystalline film on drying; and
  (h) drying said web or tube of cellulose hydrate gel to form a web-shaped or tubular packaging film of fiber-reinforced regenerated cellulose with a water content of less than about 15% by weight; relative to the total weight of said film, said drying being carried out by heating sufficient to form an impermeable polymer coating of said vinylidene chloride copolymers.

16. A process for producing a web-shaped or tubular film as claimed in claim 15, further comprising the step of applying a liquid comprising an adhesion promoter to said web or tube of cellulose hydrate gel prior to pre-drying said cellulose hydrate gel.

17. A process for producing a web-shaped or tubular film as claimed in claim 15, wherein the solids content of said first aqueous vinylidene chloride copolymer dispersion is greater than about 45% by weight, and the solids content of said second aqueous vinylidene chloride copolymer dispersion is less than the solids content of said first aqueous polyvinylidene chloride dispersion.

18. A process for producing a web-shaped or tubular film as claimed in claim 15, wherein said cellulose hydrate gel film is pre-dried to a water content of about 160 to 200% by weight, relative to the total weight of said film.

19. A process for producing a web-shaped or tubular film as claimed in claim 17, wherein the quantity of water absorbed by said cellulose hydrate gel film from said first aqueous vinylidene chloride copolymer dispersion is less than the quantity of water removed from said cellulose hydrate gel film in the preceding pre-drying step.

* * * * *